No. 823,688. PATENTED JUNE 19, 1906.
C. KREMER.
APPARATUS FOR THE RECOVERY OF FATS AND THE LIKE FROM WASTE WATERS.
APPLICATION FILED FEB. 1, 1906.

2 SHEETS—SHEET 1.

WITNESSES,
George G. Schoenlank
W. H. Berrigan

INVENTOR,
CHRISTOPH KREMER,
BY H. van Oldenneel
Attorney.

UNITED STATES PATENT OFFICE.

CHRISTOPH KREMER, OF BERLIN, GERMANY.

APPARATUS FOR THE RECOVERY OF FATS AND THE LIKE FROM WASTE WATERS.

No. 823,688.　　　Specification of Letters Patent.　　Patented June 19, 1906.

Application filed February 1, 1906. Serial No. 298,964.

*To all whom it may concern:*

Be it known that I, CHRISTOPH KREMER, a subject of the King of Prussia, German Emperor, residing at Lindenstrasse 111, Berlin, Germany, have invented new and useful Improvements in Apparatus for the Recovery of Fats and the Like from Waste Waters, of which the following is a specification.

This invention relates to apparatus for the recovery of fats and the like; and it consists in improvements of the class of apparatus protected by United States Letters Patent No. 751,303.

The present apparatus is intended to overcome two disadvantages: first, to prevent particles of fat being carried away in the overflow, and thus allowed to escape, which has been hitherto unavoidable, particularly during a strong inflow of the waste waters into the apparatus and a strong movement of the same therein, and, further, to recover such particles of fat as are contained in the specifically heavy materials which fall to the bottom of the apparatus. Though the percentage of these particles of fat is considerable, they are mixed so intimately with the settled substances that they cannot usually be separated therefrom without special means.

In order that this invention may be the better understood, I now proceed to describe the same, reference being had to the accompanying drawings and to the letters marked thereon.

Figure 1:
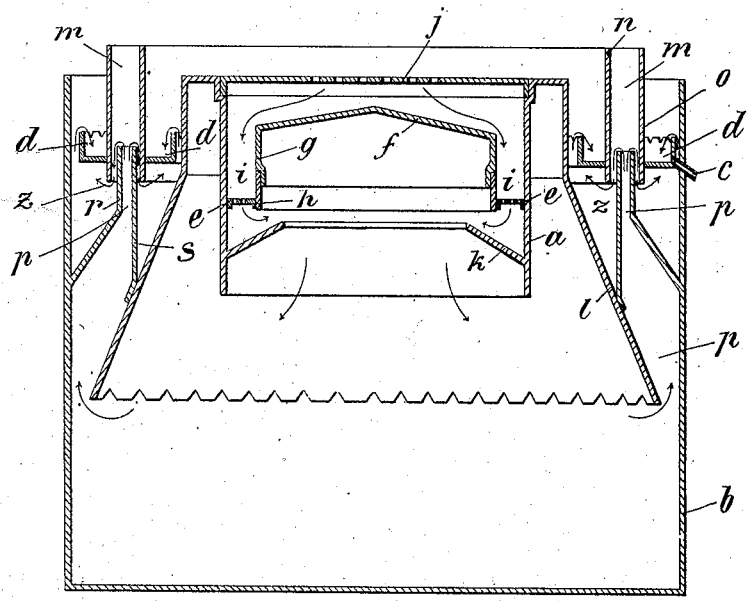
Figure 2:
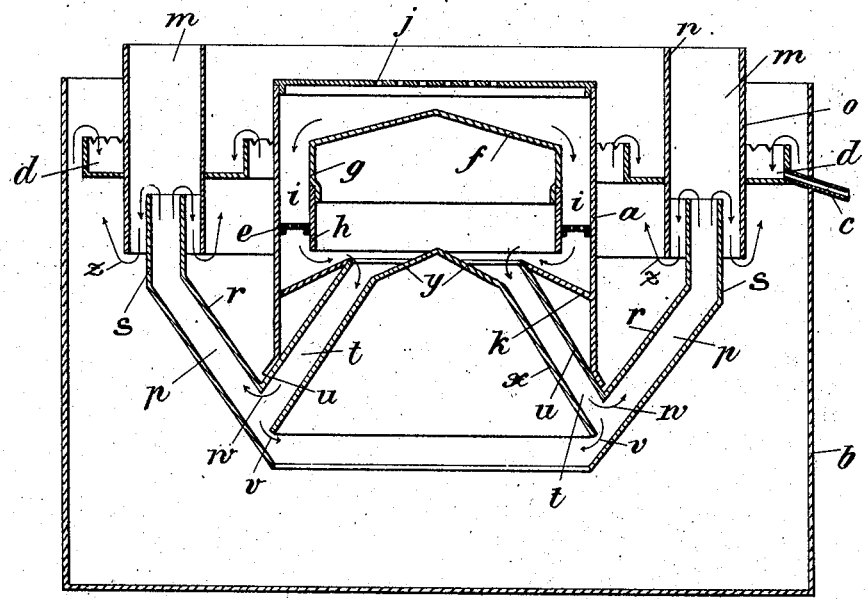

Figure 1 shows a vertical section through apparatus constructed according to my invention. Fig. 2 shows a vertical section through a modified form of apparatus.

In order to prevent any particles of fat being carried into the overflow-channel, intermediate devices (deflecting or intercepting devices are shown in the drawings) are arranged according to the present invention in front of the overflow-channel and constructed so that any particles of fat carried by the current are separated therein and recovered by their specific gravity, so that only such waters escape which have been completely freed from fat.

In Fig. 1, $a$ and $b$ are the inner and outer vessels communicating with each other, $a$ being open below and $b$ being provided with a bottom. The vessel $a$ is provided with an internal cylindrical device, such as ring $h$, in any suitable manner, so that an annular channel $i$ is formed, through which the waste waters pass; further, the vessel $a$ is provided around its entire inner periphery and below the part $h$ with a projecting rim $k$, which slants upward, so that the waste waters which pass through a sieve-like cover $j$ into the vessel $a$ and through annular channel $i$ and a sieve $e$, arranged therein in the direction of the arrows, as more particularly pointed out in said Patent No. 751,303, are forced by the projecting rim $k$ to ascend into the dome $f g$, fitted on the cylindrical device $h$ in order to leave there the main quantity of the fat contained in such waste waters. Between the vessels $a$ and $b$ is provided a bell-shaped receptacle $l$, open at the bottom, which is designed to present another baffle edge or edges to the waste waters, which pass from the vessel $a$ to the vessel $b$ by the lower rim, which is preferably serrated or recessed. An overflow-channel $d$ is also provided, and the upper edges thereof are also preferably serrated or recessed. I prefer that said channel shall be, as shown, divided by a circular channel $m$, which is formed by two concentric walls or rings $n$ and $o$. In the lower orifice of this channel terminates a second channel $p$, formed between concentric walls $r$ and $s$, and which forces the waste waters ascending from the lower enlarged end of the bell-shaped receptacle $l$ to pass in the direction shown by the arrows $z$, so that the waters first flow over the overflow edges of the walls $r s$, leave in the channel $m$ any fat which may still be carried in them, and ascend again after flowing under the lower edges of the wall $n o$, and pass through the overflow-channel $d$ to the exit-tube $c$.

In the apparatus shown in Fig. 2 means are also provided in order to separate the fat which is mixed intimately with the heavy settling materials. It has been found that such separation is possible if the floating substances containing the fat are subjected to strong agitation. For this purpose baffle devices are constructed in the communicating passage between the fat-collector $a$ and the vessel $b$, surrounding it and provided with a bottom in such a manner that the substances which are otherwise thrown down upon the bottom of the vessel $b$ do not descend merely by their own gravity—say in vertical direction on the bottom of the receptacle $b$—as is the case in the apparatus shown in Fig. 1, but are pressed, on the one hand, under the influence of the current of inflowing water, through narrow channels, preferably formed between the baffle devices, and, on the other hand, a separation of fat is effected by the friction to which the descending substances are subjected on the surfaces of the baffle devices. With the apparatus of Fig. 2 the fat can be separated partly in the fat-recovering device $a$ and partly in a concentric channel $m$, like that stated when describing Fig. 1. Thus the heavy descending substances are energetically agitated by this improved arrangement and are freed mechanically from the adhering particles of fat.

The construction, combination, and arrangement of parts $a$, $b$, $d$, $f$, $g$, $h$, $n$, and $o$ are in essential respects like that described with relation to Fig. 1.

The concentric channel $p$ (formed between the parts $r$ and $s$) is connected at its lower end to the lower end of an outwardly-flaring channel $f$ below the cylindrical device $h$ and formed between the walls of the cones $u$ and $x$, the former opening to the rim $k$ and the latter terminating in a closed conical top $y$. The lower end of the conical channel $t$ communicates with the channel $p$ in such a manner that the waste waters flowing from the cylindrical device $h$ ascend in the channel $p$ in the direction of the arrows $w$, while simultaneously the heavier materials pass the lower edge of the inner wall of the cone or funnel $x$ downwardly in the direction of the arrows $v$ and can fall onto the bottom of the vessel $b$.

In consequence of the narrowing of the transverse section caused by the formation of the channel $t$ the settling materials descending through the latter are subjected by the fluid-pressure to friction within themselves and against the walls $x$ and $u$ of the channel $t$, whereby the particles of fat held mechanically in the said materials are loosened and pass upward in part against the current owing to their slight specific gravity, into the top $f g$ of the cylindrical device $h$, and in part downwardly through the channel $p$ to be separated in the channel $m$. The settling materials freed from fat pass in the direction of the arrows $v$ and are deposited on the bottom of the vessel $b$.

In each of the forms of apparatus illustrated the water escapes or discharges by way of the pipe $c$. With reference to the removal of fat from either form of apparatus the perforated plate $j$ and the dome $f$ are lifted, and the accumulated fatty material may then be removed by means of dippers or otherwise.

Having thus described my invention, what I claim as new, and desire to secure by Letters Patent, is—

1. In an apparatus for recovery of fat from liquids, the combination of an outer vessel, an inner vessel open at its bottom, a ring-like fat-collecting chamber between the said vessels, and a channel for leading water discharged from the inner vessel to the lower part of the fat-collecting chamber, discharge-orifices being formed between the upper end of the said channel and the lower end of said chamber.

2. In an apparatus for recovery of fat from liquids, the combination of an outer vessel, an inner vessel open at its bottom, a fat-collecting chamber between the inner and outer vessels, a channel for leading water discharged from the inner vessel to the fat-collecting chamber aforesaid, an overflow-channel arranged externally of said chamber, and a discharge-orifice from the chamber to the overflow-channel.

3. In an apparatus for recovery of fats from liquids, the combination of an outer vessel, an inner fat-collecting vessel $a$ open at its bottom, an annular fat-collecting chamber $m$ open at its bottom and consisting of two parallel plates arranged outside of and away from the vessel $a$, an annular chamber below said chamber $m$ and open at its top and with said open top entering and spaced away from the open bottom of the chamber $m$.

4. In an apparatus for the recovery of fats from liquids, the combination of an outer vessel, an inner fat-collecting vessel $a$ open at its bottom, a baffle device located below said inner vessel, an annular fat-collecting chamber $m$ open at its bottom and consisting of two parallel plates arranged outside of and away from the vessel $a$ and an annular channel below said chamber $m$ and open at its top and with said open top entering and spaced away from the open bottom of the chamber $m$.

5. In an apparatus for recovery of fats from liquids, the combination of an outer vessel, an inner fat-collecting vessel $a$ open at its bottom, a conical channel located below said inner vessel, an annular fat-collecting chamber $m$ open at its bottom and consisting of two parallel plates arranged outside of and away from the vessel $a$, and an annular channel below said chamber $m$, and open at its top and with said open top entering and spaced away from the open bottom of the chamber $m$.

In witness whereof I have hereunto set my hand in the presence of two witnesses.

CHRISTOPH KREMER.

Witnesses:
W. KLIBALD DANIEL KÖNIG,
MORSE SCHÖNE.